June 10, 1958

R. M. WEIDENMILLER ET AL 2,838,012

COOKIE FORMING MACHINE

Filed June 24, 1955

Inventors
Robert M. Weidenmiller
and Jack E. Weidenmiller
By
Mann, Brown and Hanemann.
Attys

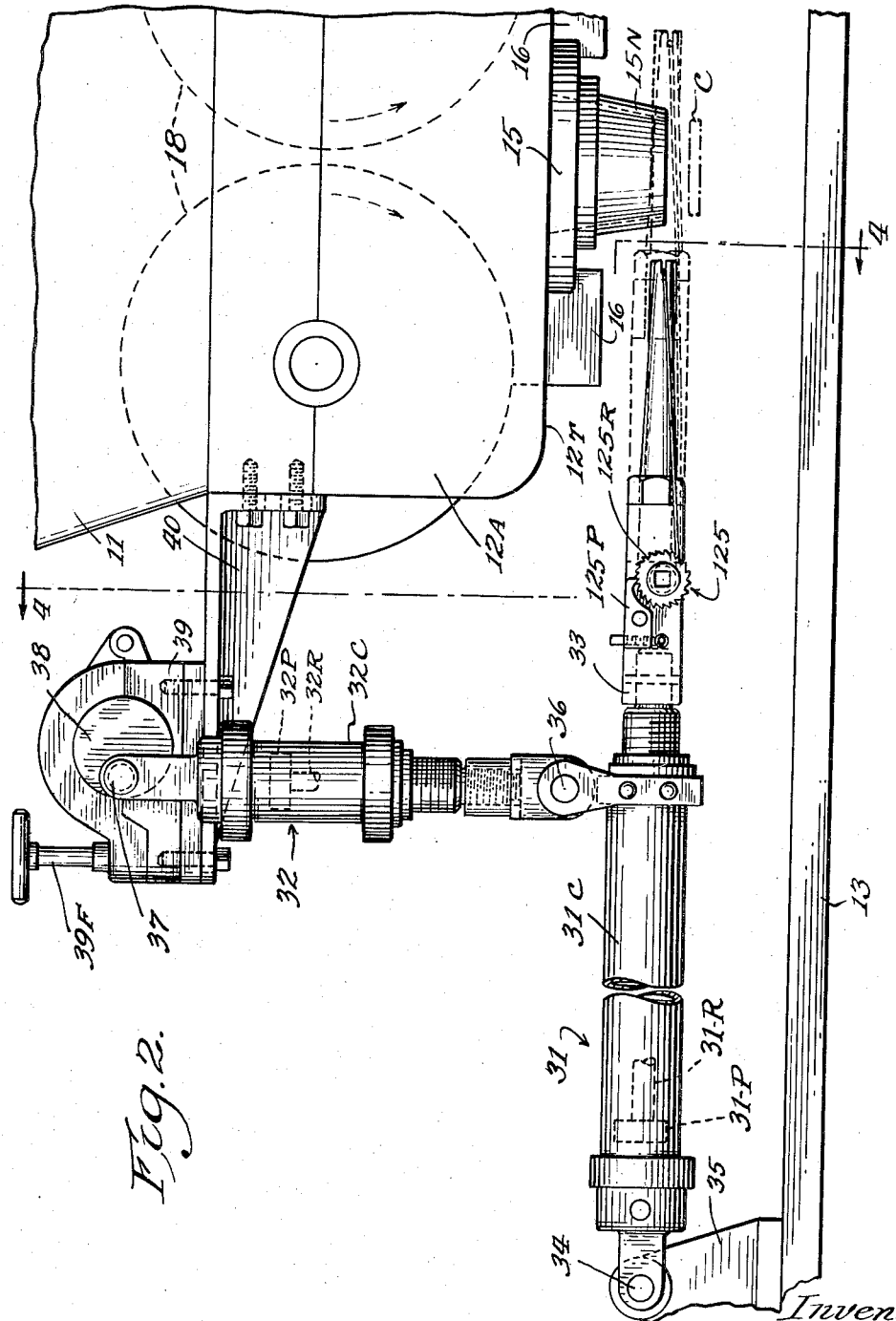

June 10, 1958 R. M. WEIDENMILLER ET AL 2,838,012
COOKIE FORMING MACHINE
Filed June 24, 1955 4 Sheets-Sheet 3
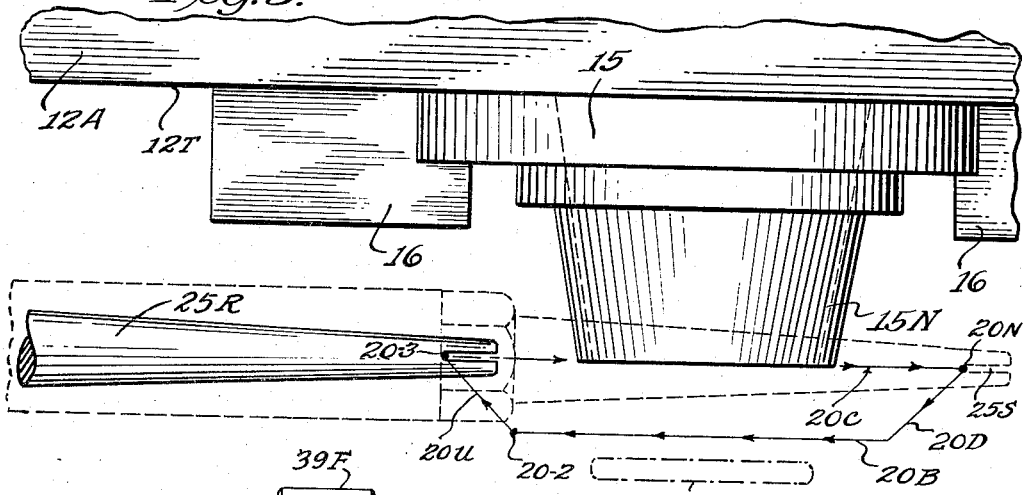
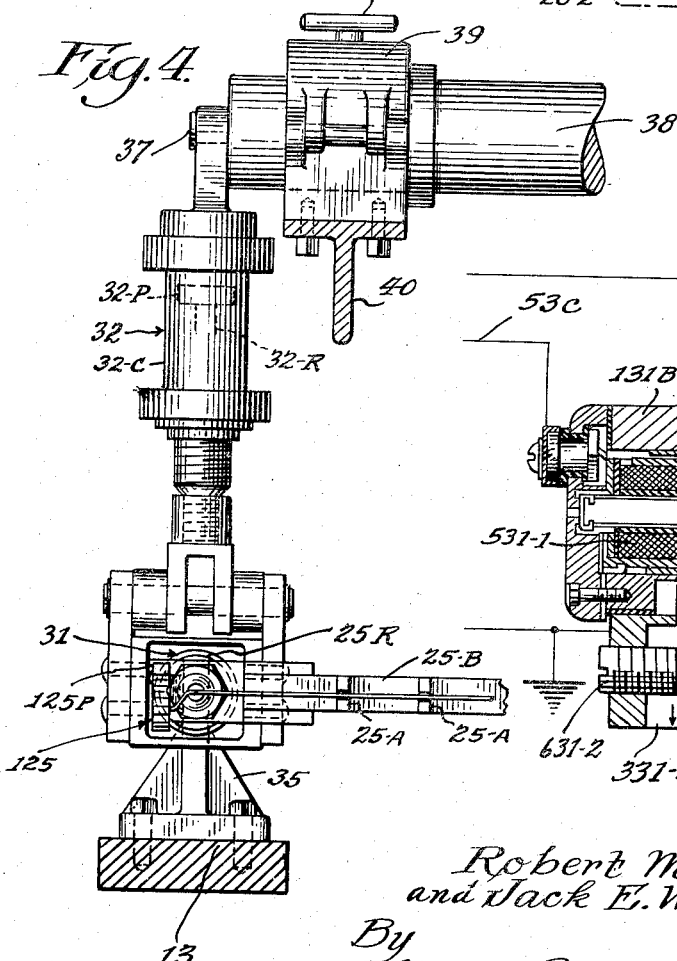
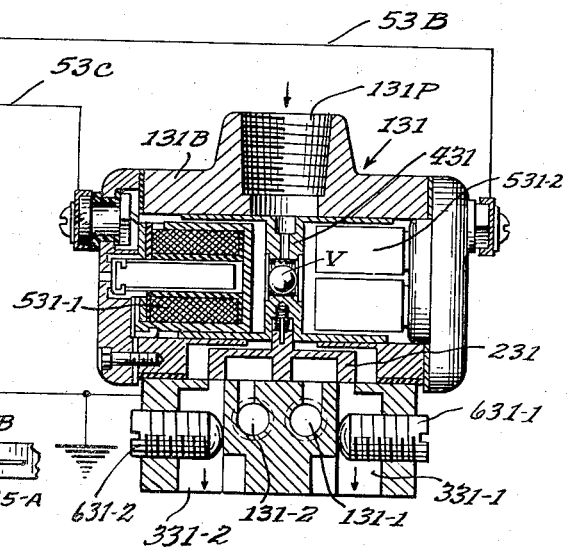
Inventors
Robert M. Weidenmiller
and Jack E. Weidenmiller
By
Mann, Brown and Hansmann
Attys.

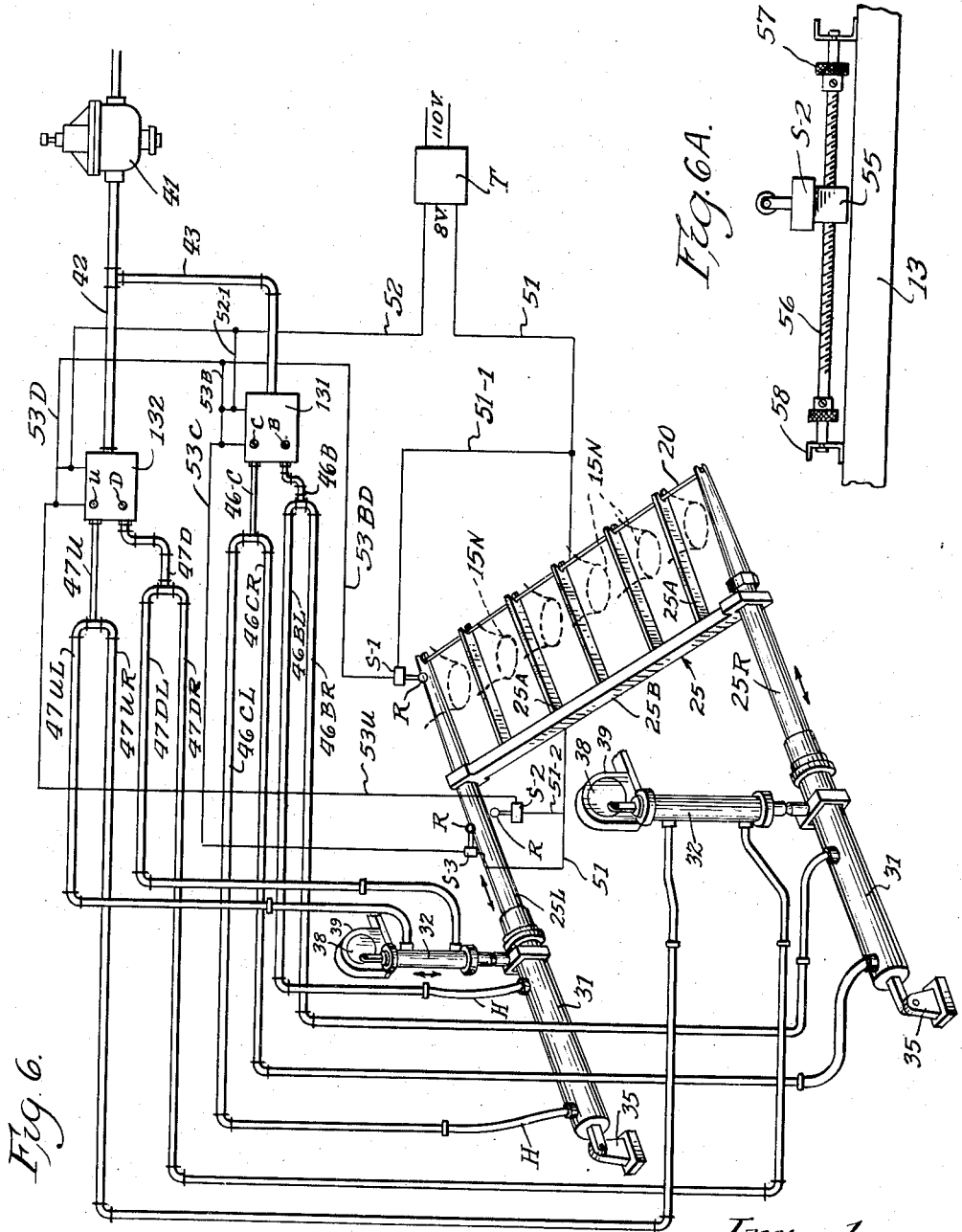

United States Patent Office 2,838,012
Patented June 10, 1958

2,838,012

COOKIE FORMING MACHINE

Robert M. Weidenmiller, Northbrook, and Jack E. Weidenmiller, Chicago, Ill., assignors to Edward Weidenmiller Co., Inc., Chicago, Ill.

Application June 24, 1955, Serial No. 517,783

7 Claims. (Cl. 107—29)

This invention relates to cookie forming machines and particularly to such machines of the wire-cut type.

In cookie machines of the wire-cut type, the dough is supplied to an open topped hopper, the bottom of which is defined primarily by a pair of parallel longitudinally grooved feed rolls that are driven synchronously so as to feed the dough downwardly between the rolls and toward an extrusion plate that has a plurality of downwardly opening extrusion nozzles that terminate in a common horizontal plane, and the dough that is extruded at a continuous rate from these nozzles is periodically cut into thin slices that constitute cookies and which drop onto the usual pan or conveyor so that they may be transported to the oven for baking.

In prior machines this cutting operation has been performed by a wire that is stretched beneath the hopper parallel to the plane of the lower ends of the extrusion nozzles and which could be moved through a cutting cycle in the proper timed relationship to produce the cookies as above described. Such a cutting cycle of the wire includes a horizontal cutting stroke in which the wire is moved along or across the lower ends of the nozzles so as to sever the lower portion of the extruded material from the main body thereof, and after the cookie blank has thus been severed, it drops downwardly fairly rapidly. The cutting wire must then be returned to its initial position, and in such movement must be lowered so that it does not interfere with the material that is being constantly extruded in a downwardly direction. Thus, the cutting cycle next includes a lowering movement of the wire, a return movement of the wire, and finally a raising movement which returns the wire to its cutting plane and puts it in position for performance of the next cookie cutting cycle.

In wire-cut machines as heretofore used the attainment of the desired cookie cutting cycle of the cutting wire has involved the use of a large amount of equipment which required a separate power drive of an adjustable character and which also involved relatively heavy cam and cam follower means that were costly to produce and operate, and which were exceedingly noisy and subject to extreme wear in continued use of the machine.

In view of the foregoing, it is the primary object of the present invention to simplify wire cut cookie machines and particularly to simplify and improve the wire supporting and actuating means. Other and related objects of the present invention are to enable the wire supporting and actuating means to be more readily adjusted as to speed, frequency and extent of stroke, and to reduce the mass of the moving parts so that the reversals of movement thereof may be accomplished without objectionable noise and vibration.

Other and more specific objects of the present invention are to enable the wire supporting and actuating means to be operated pneumatically and to accomplish this in such a way that the adjustment of speed may be independently attained as to each of the several strokes that are included in the cookie cutting cycle of the wire while adjustment of stroke length and position of stroke may be attained as to the horizontal movements of the wire. Further objects are to enable the pneumatic actuating means of such a structure to constitute structural elements that support the wire during its operating cycle.

Other and further objects of the present invention will be apparent from the following description and claims, and are illustrated in the accompanying drawings, which, by way of illustration, show a preferred embodiment of the present invention and the principles thereof, and what we now consider to be the best mode in which we have contemplated applying these principles. Other embodiments of the invention embodying the same or equivalent principles may be used and structural changes may be made as desired by those skilled in the art without departing from the invention.

In the drawings:

Fig. 2 is a fragmentary side elevational view of the machine;

Fig. 3 is an enlarged schematic side elevational view similar in some respects to Fig. 2 and illustrating the cookie cutting cycle of the cutting wire;

Fig. 4 is a vertical sectional view of a part of the actuating and wire supporting mechanism, the view being taken substantially along the line 4—4 of Fig 2;

Fig. 5 is a schematic sectional view of a solenoid controlled pneumatic valve that is utilized in the system;

Fig. 6 is a schematic perspective view illustrating the electrical and pneumatic controls for the pneumatic actuating mechanism of the machine; and Fig. 6A is a fragmentary view showing the adjustable control switch mounting.

Figure 1:
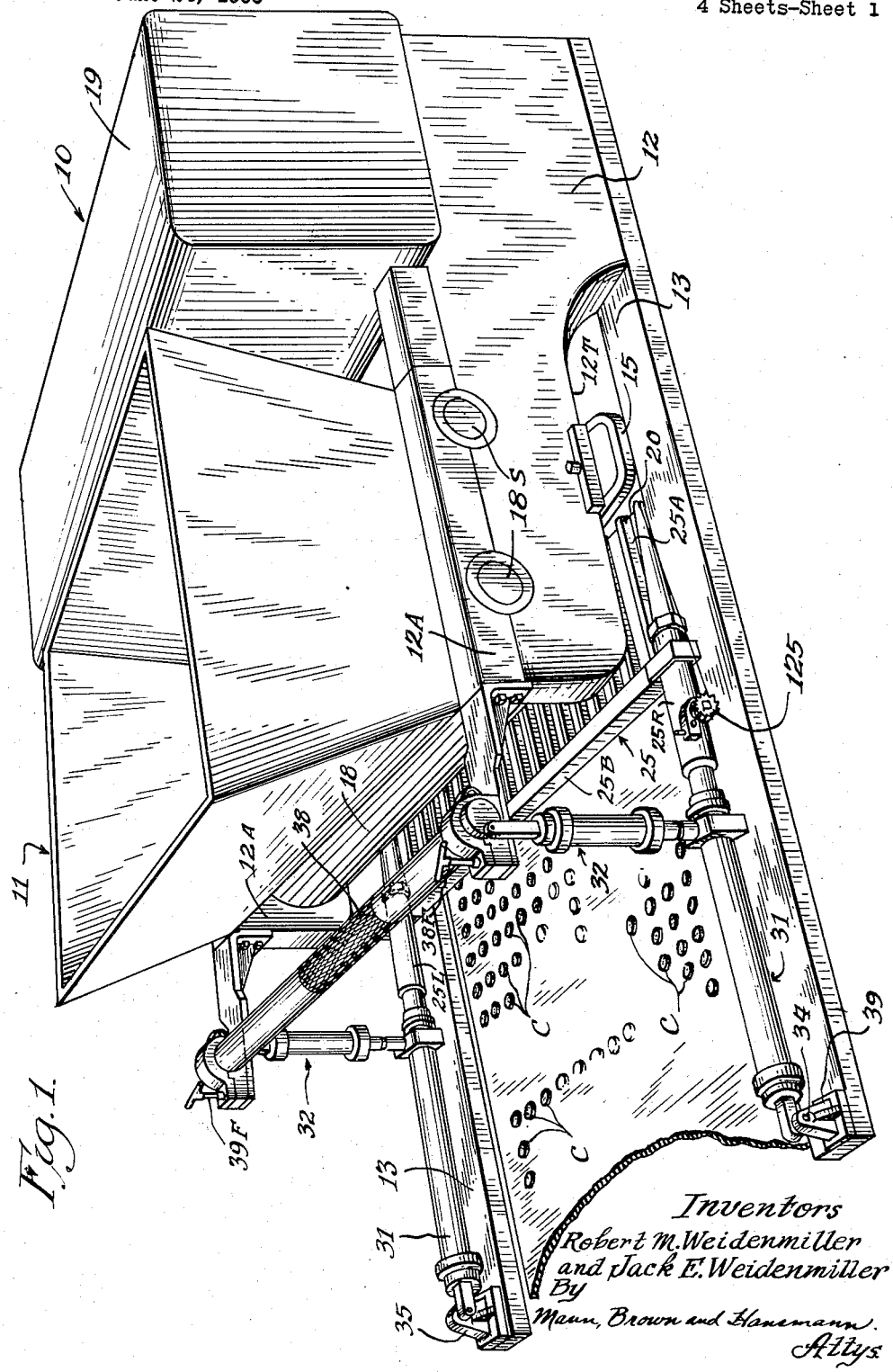
Fig. 1 is a perspective view of a wire-cut cookie forming machine embodying the features of the invention.

For purposes of disclosure the invention is herein illustrated as embodied in a wire-cut cookie forming machine 10 having an open topped dough receiving hopper 11 that is carried upon projecting arms 12A of a pair of side frame plates 12, these side frame plates being rigidly fixed near their rear or right-hand ends to a pair of parallel base plates 13 that are relatively long and which extend for a considerable distance forwardly or to the left from the side frame plates 12. The base plates 13 are adapted to be mounted in the usual manner on the side frame elements of conventional bakery equipment such as a pan conveyor or a steel band conveyor, the steel band conveyor, of course, being of the type which serves as a supporting surface for the cookies as they are moved through the oven.

The extensions 12A of the side plates are spaced upwardly a considerable distance from the upper faces of the base plates 13, thus to provide a throat 12T, and on the upper edge of this throat 12T as defined by the lower edge of the extensions 12A, an extrusion plate 15 is removably supported by means including brackets 16. Fig. 3. This extrusion plate 15 has a plurality of downwardly extending tapered nozzles 15N that terminate in lower ends that are disposed in a common horizontal plane, and this structure is conventional in character and provides for variation in the size, number and shape of extrusion openings. The hopper 11 is, in the use of the machine, filled with dough and such dough rests upon a pair of parallel grooved feed rolls 18 that are supported on drive shafts 18S that extend into the side frame extensions 12A as will be evident in Fig. 1 of the drawings. Such feed rolls are driven in a conventional manner through suitable speed reduction gearing from drive mechanism that is housed within a housing 19 that is secured to and rests on the rear or right-hand ends of the side plates 12 as will be evident in Fig. 1 of the drawings. The feed rolls 18 have their adjacent edges relatively close together, as shown in Fig. 2, and when rotated in the direction indicated by the arrows in Fig. 2, these rolls force the dough downwardly and with a uniform action toward the extrusion nozzles 15N, and this dough is thus extruded from the several nozzles 15N at a uniform rate and in the shape and size that is determined by the particular extrusion plate that is in position in the machine.

As the dough is thus being constantly extruded from the nozzles 15N, the dough is cut periodically in a horizontal plane by the action of a cutting wire 20 so as to produce a cookie C which drops downwardly from its nozzle as indicated in dotted outline in Fig. 2 of the drawings. Under and in accordance with the present invention the cutting wire 20 is mounted in an extremely simple manner, and is actuated by an efficient and readily controllable mechanism that is also simple in character. This mechanism is pneumatic in character and serves as a part of the supporting means as well as the wire actuator.

Thus a wire supporting frame 25 is provided that has parallel and generally horizontal arms 25R and 25L at its opposite sides and these arms are connected by a rigid cross bar 25B. The cross bar 25B is located a substantial distance forwardly or to the left, Fig. 1, with respect to the rear ends of the arms 25L and 25R, and at their rear ends these arms have longitudinal slots 25S formed therein so that a wire may be extended through these slots and may be tensioned so as to afford an effective cutting element. In the present instance the wire 20 is anchored on the left-hand arm 25L and is extended through the slot 25S of this arm, across the space between the two arms and through the slot 25S of the right-hand arm, and is then extended about a winding drum mechanism 125 that includes a ratchet 125R and a securing pawl 125P as shown in Fig. 2 of the drawings. By rotating the winding drum in a conventional manner, the wire 20 may be properly tensioned. Since machines of this character are relatively wide, the wire 20 is also supported at spaced points throughout its length and this is accomplished by providing a plurality of arms 25A fixed to the cross bar 25B and extending rearwardly from the bar parallel to the arms 25L and 25R. These intermediate arms 25A are spaced so as to be located between the several extrusion nozzles 15N, and at their rear ends the arms 25A are notched so as to embrace the wire 20. Thus the arms 25A afford vertical support for the wire 20 and also afford support for imparting pushing movement to the wire 20 at spaced points during actual cookie cutting stroke.

The wire supporting frame 25 is, under the present invention, carried and actuated by pneumatic piston and cylinder means. Thus a pair of main pneumatic piston and cylinder devices 31 are provided for imparting horizontal reciprocating movements to the wire supporting frame 25, while a pair of secondary and vertically positioned piston and cylinder devices 32 are provided for imparting vertical components of movement to the wire supporting frame 25. The main piston and cylinder devices 31 embody a cylinder 31C and a piston 31P, and the piston rod 31R thereof is extended from the rear ends of the cylinder 31C and is connected by means of a pinned joint 33 to the forward end of the related arm 25L or 25R of the wire supporting frame. This connection is such that the side arms of the wire supporting frame 25 constitute, in effect, longitudinal extensions of the piston rods of the respective piston and cylinder devices 31.

The other or forward end of each cylinder 31C is pivoted on a horizontal pivot 34 on a bracket 35 that is mounted on the forward end of the related base plate 13.

The secondary or vertical piston and cylinder devices 32 are arranged so that they may be operated to raise and lower the rear or right-hand ends of the cylinders 31C, thus to enable the two sets of cylinders 31 and 32 to impart the desired sequence of movements to the cutting wire 20. Thus each secondary piston and cylinder device 32 comprises a cylinder 32C, a piston 32P and a piston rod 32R, and the piston rod extends from the lower end of its cylinder 32C and is connected by means including a horizontal pivot pin 36 to the rear or right-hand end of its related cylinder 31C, as will be evident in Figs. 1 and 2 of the drawings. The other or upper ends of the cylinders 32C are connected by horizontal pivot pins 37 to opposite ends of an adjusting shaft 38. The shaft 38 is supported near its opposite ends in clamping brackets 39 which are in turn mounted on forwardly projecting brackets 40 that are secured to the forward ends of the related side frame members 12A. The pivot pins 37 are eccentrically mounted in corresponding positions on opposite ends of the adjusting shaft 38 so that by rotation of the shaft 38, the vertical positions of the cylinders 32C may be adjusted in unison. When such adjustment has been accomplished, the adjusting shaft 38 may be locked in position by tightening of locking fittings 39F.

With the structure that is thus afforded, the vertical position of the cutting wire 20 may be changed by appropriate actuation of the vertical piston and cylinder devices 32 between their upper and lower limits of travel, it being noted that these piston and cylinder devices are double acting in character. Similarly, the double acting main piston and cylinder devices 31 may be actuated in one direction or the other to impart the necessary cutting or return strokes to the cutting wire 20.

Under and in accordance with the present invention these operations of the several piston and cylinder devices 31 and 32 may be readily governed and adjusted as to the length of the cutting stroke, the speed of the cutting stroke as well as the speed of the return stroke, and the raising and lowering movemens imparted to the wire 20 may also be adjusted as to speed. Moreover, the frequency with which the cutting stroke is repeated may be readily and easily adjusted in accordance with the requirements presented in any particular run of the machine. Thus the respective pneumatic cylinders 31 and 32 are governed by solenoid controlled reversing valves 131 and 132 that are of identical construction and which may be of the kind disclosed in Bellows Patent No. 2,641,229, to which reference is hereby made for details of structure and operation. The reversing valves 131 and 132 are supplied with air under pressure through an adjustable pressure reducing valve 41 and supply pipes 42 and 43, and the pressure air is then supplied to the piston and cylinder devices 31 and 32 under the control of the reversing valves 131 and 132. While the reversing valves are described in detail in the aforesaid prior patent, a schematic view thereof has been included herein as Fig. 5 of the drawings. As there shown, the valve body 131B has an inlet passage 131D to which the supply pipe 42 or 43 may be connected. The valve structure has a pair of outlet passages 131—1 and 131—2 which are alternately connected to the supply passage 131P by shifting movement of a valve member 231. When one of the outlet passages 131—1 or 131—2 is connected to the supply passage 131P, the other of these passages is connected to one or the other of two exhaust passages 331—1 or 331—2. The movements of the slide valve 231 are governed by an actuating piston 431 which as described in the aforesaid patent assumes one or the other of two extreme positions when a normally balanced pressure condition within the valve body is disturbed by operation of one or the other of two control solenoids 531—1 or 531—2. These solenoids operate upon a control valve V, and such solenoids may be selectively energized through suitable electrical connections that are established thereto. The exhaust connections 331—1 and 331—2 are provided with adjusting screws 631—1 and 631—2 whereby the effective area of the exhaust passage may be adjusted, and as will be pointed out hereinafter, the adjustment of the effective area of the exhaust passage may be utilized to control the speed of movement of the piston of the related piston and cylinder device.

In associating the reversing valves 131 and 132 with the piston and cylinder devices 31 and 32, branch connections are extended from the outlet ports 131—1 and 131—2 to the opposite ends of each of the related pair of piston and cylinder devices. Thus with respect to the reversing valve 131, a pipe 46C extends from one of the aforesaid outlet ports of the valve 131 and has a branch line 46CL connected to the forward end of the left-hand piston and cylinder devices 31, and a branch line 46CR is similarly connected to the other one of the piston and cylinder devices 31. A line 46B extended from the other one of the ports of the reversing valve 131 and has branch lines 46BL and 46BR extended respectively to the rear ends of the piston and cylinder devices 31.

As to the other reversing valve 132, pipes 47U and 47D are extended from the respective outlet ports, and the pipe 47U has branches 47UL and 47UR connected respectively to the upper ends of the two vertical piston and cylinder devices 32. The pipe 47D has branch lines 47DL and 47DR connected respectively to the lower ends of the two piston and cylinder devices. Since the several piston and cylinder devices 31 and 32 have movements applied thereto, the end portions of the several air supply connections are afforded as flexible hoses H as indicated in Fig. 6 of the drawings.

With the arrangement thus described, the operation of the piston and cylinder devices 31 and 32 may be governed so as to impart the desired movements to the cutting wire 20, and this controlling action is attained through the use of control switches S–1, S–2 and S–3 that govern the solenoids of the two reversing valves 131 and 132 and which are in turn actuated successively by the wire supporting frame 25 as the operating cycle of the frame 25 progresses.

Thus a low voltage control system is provided from the output of a transformer T, and one output lead 51 from the transformer T is extended to one contact of the switch S–3, while the branch leads 51—1 and 51—2 are connected to corresponding contacts of the switches S–1 and S–2. The other output lead 85 is extended from the transformer T to the common terminal of the control valve 132, a branch lead 52—1 being extended to the common terminal of the valve 131. The switch S–1 is utilized to cause both the downward stroke and the back stroke of the cutting frame 25, a wire 53BD is therefore extended from the other contact of the switch S–1 with branch leads 53B and 53D extended to the appropriate terminals of the valves 131 and 132, respectively.

The switch S–2 is utilized to initiate the upward stroke of the cutting frame 25, and a wire 53U is therefore extended from the outer terminal of the switch S–2 to the other terminal of the valve 132. Similarly, a wire 53C is extended from the other contact of the switch S–3 to the other terminal of the valve 131 so that the switch S–3 may be closed to initiate the cutting stroke of the cutting frame 25.

In machines of this character it may be desirable to vary the length of the cutting stroke of the frame 25, and for this purpose the several switches S–1, S–2 and S–3 may be mounted for adjustment as, for example, in the way illustrated in Fig. 6A of the drawings. Thus a carrier block 55 may be mounted on one of the frame bars 13 for sliding or adjusting movement therealong, and a switch such as the switch S–2 may be carried on such block. The block 55 is associated as a nut on an adjusting screw 56 mounted in brackets 57 and operable by a hand wheel 58.

Operation

The several switches S–1 to S–3 are so located on the frame of the machine that they will be closed in succession as the cutting wire 20 reaches predetermined points in the operating cycle thereof, and this action may be best visualized by reference to Figs. 3 and 6 of the drawings. Thus assuming that the valves 131 and 132 are so set that the wire 20 is in its raised position and is advancing through a cutting stroke 20C, Fig. 3, the cross bar 25B will engage the operating roller R of the switch S–1 when wire 20 reaches the point 20—1 of Fig. 3. This closes the switch S–1 and through wires 53BD, 53B and 53D, extends circuit to corresponding solenoids 531—1 of the valves 31 and 32.

When the solenoids 531—1 are thus energized, the slide valve 231 is shifted in each valve 131 and 132 so as to vent the lines 46C and 47U and apply pressure air to the lines 46B and 47D. The piston and cylinder devices 31 therefore impart return or back movement to the wire and the piston and cylinder devices 32 impart downward movement to the wire, so that the down wire moves downwardly along the stroke 20D as indicated in Fig. 3 until the piston and cylinder devices 32 reach their lower limit of travel. The movement thereafter is substantially horizontal and the wire 20 moves through its back stroke 20B, as indicated in Fig. 3. Before completing the full range of its return movement the cross bar 25B strikes the roller R of the control switch S–2 at the point 20—2 of Fig. 3, and through the wire 53U circuit is closed to the solenoid 131—2 of the valve 132. This causes the slide valve 231 of the valve 132 to shift to its other position, and this vents line 47D and applies pressure air to the line 47U and hence the piston and cylinder devices 32 actuate the frame 25 upwardly and the wire 20 follows an angularly upward path in a stroke 20U, as indicated in Fig. 3 of the drawings.

At about the time the wire 20 reaches the starting point 20—3 of the cutting stroke 20C, Fig. 3, bar 25B strikes the roller R of the switch S–3, thus to close circuit through the wire 53C to the solenoid 131—2 of the valve 131. This reverses the valve 131 so as to vent the pipe 46B and apply pressure air to the pipe 46C, the cutting stroke 20C of the wire is thus initiated.

The level at which the cutting stroke 20C takes place is governed jointly by the stroke length of the pistons 32P and the adjustment of the shaft 38, and the wire 20 passes with a shearing action across the lower ends of the extrusion nozzles 15N so as to sever a cookie blank C from the extruded dough at each such nozzle.

The speed of the wire 20 in its various strokes may be governed by adjustment of the control set screws 631. Thus the screws 631C and 631B of the valve 131 may be selectively adjusted to vary the speeds of the cutting and back strokes respectively, while the screws 631U and y31D may be adjusted to individually vary the speeds of the vertical components of upward and downward movement of the wire 20.

The control set screws 631 also serve, by their settings or adjusted positions, to govern the total time required for each cookie cutting cycle, and thus by appropriate adjustments of all or selected ones of these vent control screws, the number of cutting cycles may be adjustably varied as required.

From the foregoing description it will be apparent that the present invention materially improves and simplifies wire-cut cookie machines and that the mass of the reversing parts of the cutting mechanism has been so reduced as to insure smooth operation.

While a preferred embodiment of the invention has been described herein it is to be recognized that this may be varied by those skilled in the art without departing from the spirit and scope of the invention.

We claim:

1. In a wire-cut cookie machine having a hopper with feed rolls and a plurality of downwardly directed extrusion nozzles through which doughlike material may be extruded by said rolls, the combination of cut-off mechanism comprising a wire holding frame for supporting a wire in cutting position, a pair of double acting pneumatic piston and cylinder devices disposed in generally horizontal positions and having their respective pistons rigidly connected to opposite ends of the frame, means supporting the cylinders of said devices pivotally on a common axis parallel to said wire and substantially the plane of the ends of said nozzles, a second pair of pneumatic piston and cylinder devices disposed in generally vertical positions with the respective cylinders thereof supported pivotally on a common axis parallel to said first-mentioned axis, and with the respective pistons thereof pivotally connected to said first-mentioned cylinders eccentrically of said first-mentioned axis, supply means for supplying pressure air to said cylinders, and means for controlling said supply means to actuate said wire through successive cutting cycles each consisting of a cutting stroke in which said wire moves in a predetermined plane and with a shearing action across the lower ends of said nozzles, a lowering stroke, a return stroke, and a rising stroke which restores said wire to said predetermined plane.

2. In a wire-cut cookie machine having a hopper with feed rolls and a plurality of downwardly directed extrusion nozzles through which dough like material may be extruded by said rolls, the combination of cut-off mechanism comprising a wire holding frame for supporting a wire in cutting position, a pair of double acting pneumatic piston and cylinder devices disposed in generally horizontal positions and having their respective pistons rigidly connected to opposite ends of the frame, means supporting the cylinders of said devices pivotally on a common axis parallel to said wire and substantially the plane of the ends of said nozzles, a second pair of pneumatic piston and cylinder devices disposed in generally vertical positions with the respective cylinders thereof supported pivotally on a common axis parallel to said first-mentioned axis, and with the respective pistons thereof pivotally connected to said first-mentioned cylinders eccentrically of said first-mentioned axis, supply means for supplying pressure air to the respective pairs of cylinders, and control means including shiftable control elements disposed in the path of movement of said frame for controlling said supply means to actuate said wire through successive cutting cycles each consisting of a cutting stroke in which said wire moves in a predetermined plane and with a shearing action across the lower ends of said nozzles, a lowering stroke, a return stroke, and a rising stroke which restores said wire to said predetermined plane.

3. In combination with the extrusion nozzles of a wire-cut cookie forming machine, a wire supporting frame having side members pivoted at one end on an axis parallel to the plane of said nozzles, and having a cutting wire stretched between the other ends of said side members, each of said side members being longitudinally extensible, actuating means for extending and shortening said side members in unison to impart motion to said wire in a generally horizontal direction, and actuating means for pivoting said side members in unison to impart vertical movements to said wire.

4. In combination with the extrusion nozzles of a wire-cut cookie forming machine, a wire supporting frame having side members pivoted at one end on an axis parallel to the plane of said nozzles, and having a cutting wire stretched between the other ends of said side members, each of said side members being longitudinally extensible, actuating means for extending and shortening said side members in unison to impart motion to said wire in a generally horizontal direction, actuating means for pivoting said side members in unison to impart vertical movements to said wire, and control means for said actuating means for imparting cutting and lowered return stroke to said wire.

5. In combination with the extrusion nozzles of a wire-cut cookie forming machine, a wire supporting frame having side members pivoted at one end on an axis parallel to the plane of said nozzles, and having a cutting wire stretched between the other ends of said side members, each of said side members being longitudinally extensible, actuating means for extending and shortening said side members in unison to impart motion to said wire in a generally horizontal direction, actuating means for pivoting said side members in unison to impart vertical movements to said wire, and control means rendered effective by said frame as said wire is moved to govern said actuating means.

6. In a wire-cut cookie machine having a hopper with feed rolls and a plurality of downwardly directed extrusion nozzles through which dough like material may be extruded by said rolls, the combination of cut-off mechanism comprising a wire holding frame comprising a pair of parallel and generally horizontal side members pivoted on a common axis at one end and having a cutting wire stretched between the other ends thereof, each of said side members including a piston and cylinder device forming part thereof and operable to extend or shorten said members, actuating means for pivoting said arms in unison to raise and lower said wire, pressure fluid supply means for said piston and cylinder devices, and control means governing said actuating means and said supply means to impart successive cookie cutting cycles of movement to said wire.

7. In a wire-cut cookie machine having a hopper with feed rolls and a plurality of downwardly directed extrusion nozzles through which dough like material may be extruded by said rolls, the combination of cut-off mechanism comprising a wire holding frame comprising a pair of parallel longitudinally extensible side members pivoted on a common axis at one end and having a cutting wire stretched between the other ends thereof, said members being disposed in generally horizontal positions and having actuating means carried thereon for extending and shortening said members to impart generally horizontal movements to said wire, other actuating means for pivoting said side members to impart vertical movements to said wire, and coordinated control means for said actuating means.

References Cited in the file of this patent

UNITED STATES PATENTS

| | | |
|---|---|---|
| 911,851 | Tucker | Feb. 9, 1909 |
| 2,162,145 | Werner | June 13, 1939 |
| 2,488,046 | Erner et al. | Nov. 15, 1949 |
| 2,688,847 | Harness et al. | Sept. 14, 1954 |
| 2,696,082 | Fouron et al. | Dec. 7, 1954 |